United States Patent
Kapoor et al.

(10) Patent No.: US 7,681,185 B2
(45) Date of Patent: Mar. 16, 2010

(54) TEMPLATE-DRIVEN APPROACH TO EXTRACT, TRANSFORM, AND/OR LOAD

(75) Inventors: Rahul Kapoor, Bellevue, WA (US); Sandhya D Jain, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1190 days.

(21) Appl. No.: 11/248,632

(22) Filed: Oct. 12, 2005

(65) Prior Publication Data

US 2007/0083850 A1 Apr. 12, 2007

(51) Int. Cl.
*G06F 9/45* (2006.01)

(52) U.S. Cl. .................. 717/140; 717/106; 707/101

(58) Field of Classification Search .................. 717/106
See application file for complete search history.

(56) References Cited

U.S. PATENT DOCUMENTS

| | | | |
|---|---|---|---|
| 4,044,336 A | 8/1977 | Babb | |
| 4,192,004 A | 3/1980 | Buerger | |
| 5,438,628 A | 8/1995 | Spitz et al. | |
| 5,692,181 A | 11/1997 | Anand et al. | |
| 5,717,915 A | 2/1998 | Stolfo et al. | |
| 5,819,265 A | 10/1998 | Ravin et al. | |
| 6,003,039 A | 12/1999 | Barry et al. | |
| 6,035,303 A | 3/2000 | Baer et al. | |
| 6,041,141 A | 3/2000 | Yamamoto et al. | |
| 6,279,033 B1 | 8/2001 | Selvarajan et al. | |
| 6,549,916 B1 | 4/2003 | Sedlar | |
| 6,636,850 B2 | 10/2003 | Lepien | |
| 6,658,626 B1 | 12/2003 | Aiken | |
| 6,738,768 B1 | 5/2004 | Johnson | |
| 6,772,409 B1 * | 8/2004 | Chawla et al. .............. | 717/106 |
| 6,879,986 B1 | 4/2005 | Fisher | |
| 6,917,944 B1 | 7/2005 | Prasad et al. | |
| 7,143,107 B1 | 11/2006 | Nebres, Jr. | |
| 7,167,864 B1 | 1/2007 | Vasudevan | |
| 7,181,450 B2 | 2/2007 | Malloy et al. | |
| 7,222,130 B1 | 5/2007 | Cras et al. | |
| 7,249,118 B2 | 7/2007 | Sandler et al. | |
| 2002/0010714 A1 | 1/2002 | Hetherington | |
| 2003/0018636 A1 | 1/2003 | Chi et al. | |
| 2003/0187862 A1 | 10/2003 | Brobst | |
| 2005/0114381 A1 | 5/2005 | Borthakur et al. | |

(Continued)

OTHER PUBLICATIONS

Panos Vassiliadis, Alkis Simitsis, Panos Georgantas, Manolis Terrovitis, Spiros Skiadopoulos "A generic and customizable framework for the design of ETL scenarios" 2004.*

(Continued)

*Primary Examiner*—Wei Y Zhen
*Assistant Examiner*—Phillip H Nguyen
(74) *Attorney, Agent, or Firm*—Lee & Hayes, PLLC

(57) ABSTRACT

System(s) and/or method(s) ("tools") are described that enable multiple executable ETL (Extract, Transform, and Load) packages to be built based on a single template. The tools also enable multiple executable ETL packages to be altered by altering a single template and/or set of data parameters. In some embodiments the tools provide many types of templates that are capable, once instantiated with data parameters, of performing many different types of processes useful in extracting, transforming, and/or loading data from databases to a data warehouse. In so doing, the tools can help users to more easily, accurately, and/or robustly build ETL packages.

16 Claims, 4 Drawing Sheets

U.S. PATENT DOCUMENTS

| | | |
|---|---|---|
| 2005/0216503 A1 | 9/2005 | Charlot et al. |
| 2005/0267868 A1 | 12/2005 | Liebl et al. |
| 2005/0278290 A1 | 12/2005 | Bruce et al. |
| 2006/0101001 A1 | 5/2006 | Lindsay et al. |
| 2006/0136305 A1 | 6/2006 | Fitzsimmons et al. |
| 2006/0168434 A1 | 7/2006 | Del Vigna, Jr. et al. |

OTHER PUBLICATIONS

Bonifati, et al, "Warehousing Workflow Data: Challenges and Opportunities", retrieved at <<www.vldb.org/conf/2001/P649.pdf>>, Proceedings of the 27th VLDB Conference, 2001, pp. 1-4.

"Oracle OLAP Application Developer's Guide, 10g Release 1 (10.1)", Oracle Corporation, 2002-2003, pp. 58.

* cited by examiner

TEMPLATE-DRIVEN APPROACH TO EXTRACT, TRANSFORM, AND/OR LOAD

BACKGROUND

Currently, programmers and computing consultants build Extract, Transform, and Load (ETL) packages to extract information from various databases, transform that data, and store it in a data warehouse. This is often done to centralize data and make searching and retrieval of data easier.

But building and making changes to ETL packages is often difficult. It may require a person of extension knowledge and experience in the field of database services. And it can take months, in some instances, to build a single, executable ETL package or make changes to many ETL packages.

SUMMARY

System(s) and/or method(s) ("tools") are described that enable multiple executable ETL (Extract, Transform, and Load) packages to be built based on a single template. The tools also enable multiple executable ETL packages to be altered by altering a single template and/or set of data parameters.

In some embodiments the tools provide many types of templates that are capable, once instantiated with data parameters, of performing many different types of processes useful in extracting, transforming, and/or loading data from databases to a data warehouse. In so doing, the tools can help users to more easily, accurately, and/or robustly build ETL packages.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

Overview

The following document describes tools that enable, in some embodiments, ETL packages to be built more easily, accurately, and/or robustly. The tools may also enable ETL packages to be altered in bulk by altering a template used in building those ETL packages.

An exemplary executable ETL package, source databases, and a target data warehouse are described first below to give the reader context. This is followed by an exemplary environment in which the tools may enable the above-mentioned and other techniques. These are followed by others sections describing various inventive techniques and exemplary embodiments of the tools. One, entitled *Exemplary Custom Templates*, describes custom-built and altered selectable templates. The next is entitled *Generating and/or Altering Executable ETL Packages* and describes an exemplary process enabling generation and alteration of executable ETL packages using one or more templates.

An Exemplary Executable ETL Package

Before describing the tools in detail, the following discussion of an exemplary executable ETL package is provided to assist the reader in understanding ETL flows and packages executed to perform them. The executable ETL package described below constitutes but one example and is not intended to limit application of the tools to any one particular ETL task flow or executable package.

Figure 1:
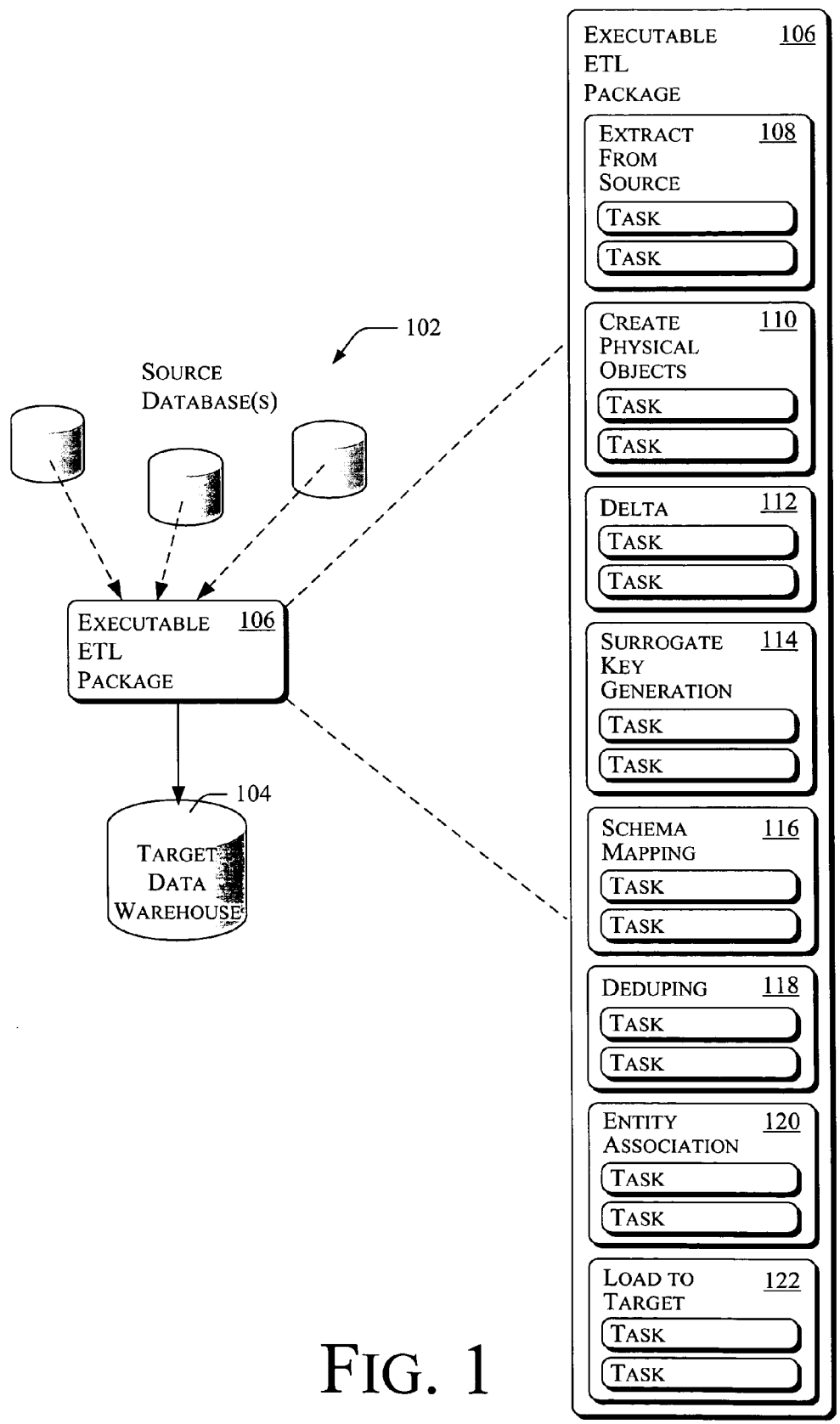
FIG. 1 illustrates an exemplary executable ETL package capable of extracting data from source database(s), transforming the extracted data, and loading the transformed data into a target data warehouse.

FIG. 1 illustrates source databases 102 from which data may be extracted and a target data warehouse 104 into which transformed, extracted data may be loaded. Exemplary executable ETL package 106 is executed (e.g., with a computing device having processor(s) and an appropriate application) to extract the data, transform it, and load the transformed data.

Executable ETL package 106 has many processes, each of which is performed in sequence. Each of these processes is built from one or more tasks (often many tasks for each process). These exemplary processes include: extract from source process 108; create physical objects process 110; delta process 112; surrogate key generation process 114; schema mapping process 116; deduping process 118; entity association process 120; and load to target process 122. Extract from source process 108 refers to a process whereby modules pull data out of a source system. Create physical objects process 110 refers to a process of creating relational tables to store extracted data in a database. Delta process 112 refers to a mechanism of identifying records that get added, deleted, or modified between consecutive data pulls. Surrogate key generation process 114 refers to generation of artificial integer keys to replace production keys. Schema mapping process 116 refers to operations performed to convert an ERP schema to a desired warehouse schema. Deduping process 118 refers to identification of approximate groups of duplicates and finding or determining a canonical record to replace each such group. Entity association process 120 refers to capturing different roles an entity plays within an organization (e.g., to get to a 360-degree view of an entity). Load to target process 122 refers to loading extracted and transformed data into a target (e.g., a table of a data warehouse).

Each of these processes is shown with two tasks, though each may require one, tens, or even dozens of complex tasks to perform each process.

This executable ETL package may be built by careful selection of each task by a programmer trained in database systems. After selection of these tasks, the programmer then inputs source tables, target tables, mapping between these tables, and other parameters, often for each and every task. Thus, the programmer may select the tasks to perform each of these processes and enter parameters for input and output to each of the tasks. The selection of the tasks and their sequence, even without input of parameters, may take a significant amount of time and expertise.

Exemplary Operating Environment

With an exemplary ETL package described above, an exemplary operating environment capable of generating that and other ETL packages is provided below. This environment is provided to assist the reader in understanding one way in which various inventive aspects of the tools may be employed. The environment described below constitutes but one example and is not intended to limit application of the tools to any one particular operating environment. Other environments may be used without departing from the spirit and scope of the claimed subject matter.

Figure 2:
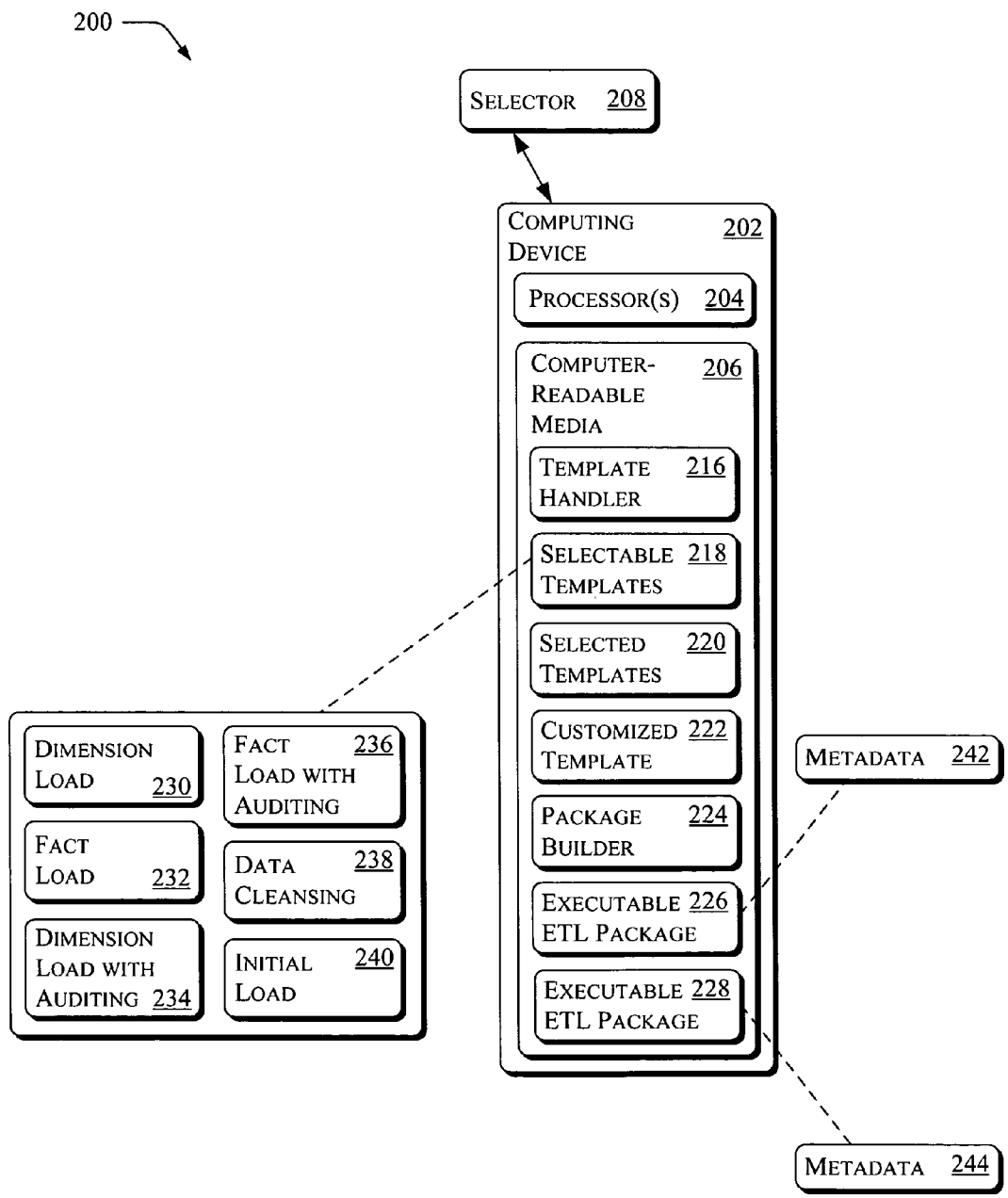
FIG. 2 illustrates an exemplary operating environment in which various embodiments can operate.

FIG. 2 illustrates one such operating environment generally at 200 comprising a computing device 202 having one or more processor(s) 204 and computer-readable media 206. The computing device is capable of interacting with a selector 208 to receive template selection(s) and/or data parameters.

The computing device's processors are capable of accessing and/or executing the computer-readable media. The computer-readable media comprises or has access to a template handler 216, selectable templates 218, selected templates 220, customized template 222, package builder 224, and two executable ETL packages 226 and 228.

The template handler enables the selector to select from the selectable templates. Each selectable template may be a data-independent, coordinated sequence of tasks. A template is data-independent in that it does not have and/or is not tied to a specific set of data parameters, such as a particular source table, target table, or mapping between them. In one embodiment, each of the templates may be used to build multiple ETL packages, where each of the ETL packages is tied to a specific set of data parameters but the template is not. This will be described in greater detail below.

A template's tasks are coordinated in that each of the tasks works together toward a particular end, such as to extract data from an Enterprise Resource Planning (ERP)-dependent source in a SQL (Structured Query Language) database, transform the data into an ERP-independent format, and/or load the data into an ERP-independent data warehouse. The sequence of the tasks may be in a particular order or be of a particular type such that a template follows a form having particular efficiencies, robustness, or other desirable characteristics.

Each task comprises one or more operations capable of use as part of an ETL flow. Each task may comprise code capable of being executed once it is instantiated with data parameter(s). A template may have many tasks, some of which are complex to comprehend or unwieldy to view. In some cases the tasks are not exposed to selector 208 in order to make building an ETL package a more intuitive or less complex task, especially for a selector that is not well-versed in ETL flows.

Selectable templates 218 are shown with six exemplary templates (though others may also be created or made available). These comprise a dimension load template 230, a fact load template 232, a dimension load with auditing template 234, a fact load with auditing template 236, a data cleansing template 238, and an initial load template 240. These templates are capable of being used to build executable ETL packages 226 and 228. The dimension load template captures the processes needed for loading a dimension table (e.g., creation of physical objects, delta identification, surrogate key generation and replacement, schema mappings). The fact load template captures the processes needed for loading a fact table (e.g., creation of physical objects, delta identification, surrogate key replacement, schema mappings). The dimension load/fact load template with auditing, in addition to the functionality of the base templates, audit every operation. The data cleansing template runs through a deduping process to partition the input into groups of duplicates followed by automated cleansing to handle the removal of all the duplicated records based on the output of the deduping process. The initial load template handles special conditions when data is loaded a first time.

Selected templates 220 are one or more of the selectable templates that have been received or selected. Customized template 222 is a custom sequence of tasks that have been made into a template or an alteration to a selectable template, such as a selectable template with an additional task.

Package builder 224 is capable of generating and/or altering an executable ETL package based on a template and data parameters.

When data parameters are used to create an executable ETL package (e.g., with one or more templates that are data-independent), the tools may also create metadata by which these data parameters may be maintained. This metadata may act to enable the tools to populate data parameters for multiple tasks. This metadata is shown at 242 for executable ETL package 226 and at 244 for executable ETL package 228.

These metadata may also comprise other information, such as information indicating the data's content, structure, relationships between various parts of the data, relevant business rules, calculation formulas, and data rights (e.g., ownership and read/write privileges). These metadata, in some embodiments, are specific to a particular business application or class of business applications that may later request it from the target data warehouse. In other embodiments, the metadata is agnostic to a particular application.

In some embodiments, a template may be used to build many different executable ETL packages. This may enable a selector (e.g., a user or programmer) to create or select one template and, with different sets of data parameters, create many packages that use that template. For instance, a user may select fact load template 232 and build hundreds of executable ETL packages using this template (though often with different data parameters).

Also, in some embodiments, the templates enable bulk changes to multiple executable ETL packages. A template may govern or be associated with many executable ETL packages, such as the hundreds of executable ETL packages using the fact load template mentioned above. A change to the fact load template may be effective to change all of the executable ETL packages using that template or having a same sequence of tasks as that of that template. Assume, for example, that the fact load template is altered to notify a user with an email when successfully performed. The tools may alter the hundreds of executable ETL packages to add this email notification based on this change to the fact load template. The tools may do so without user interaction (other than if the change made to the template was made by a user). Thus, the tools may alter many executable ETL packages based on a change to a single template.

Exemplary Custom Templates

In some embodiments a selectable template may be altered to create a custom template. In some others, a set of selected tasks are built into a custom template.

Figure 3:
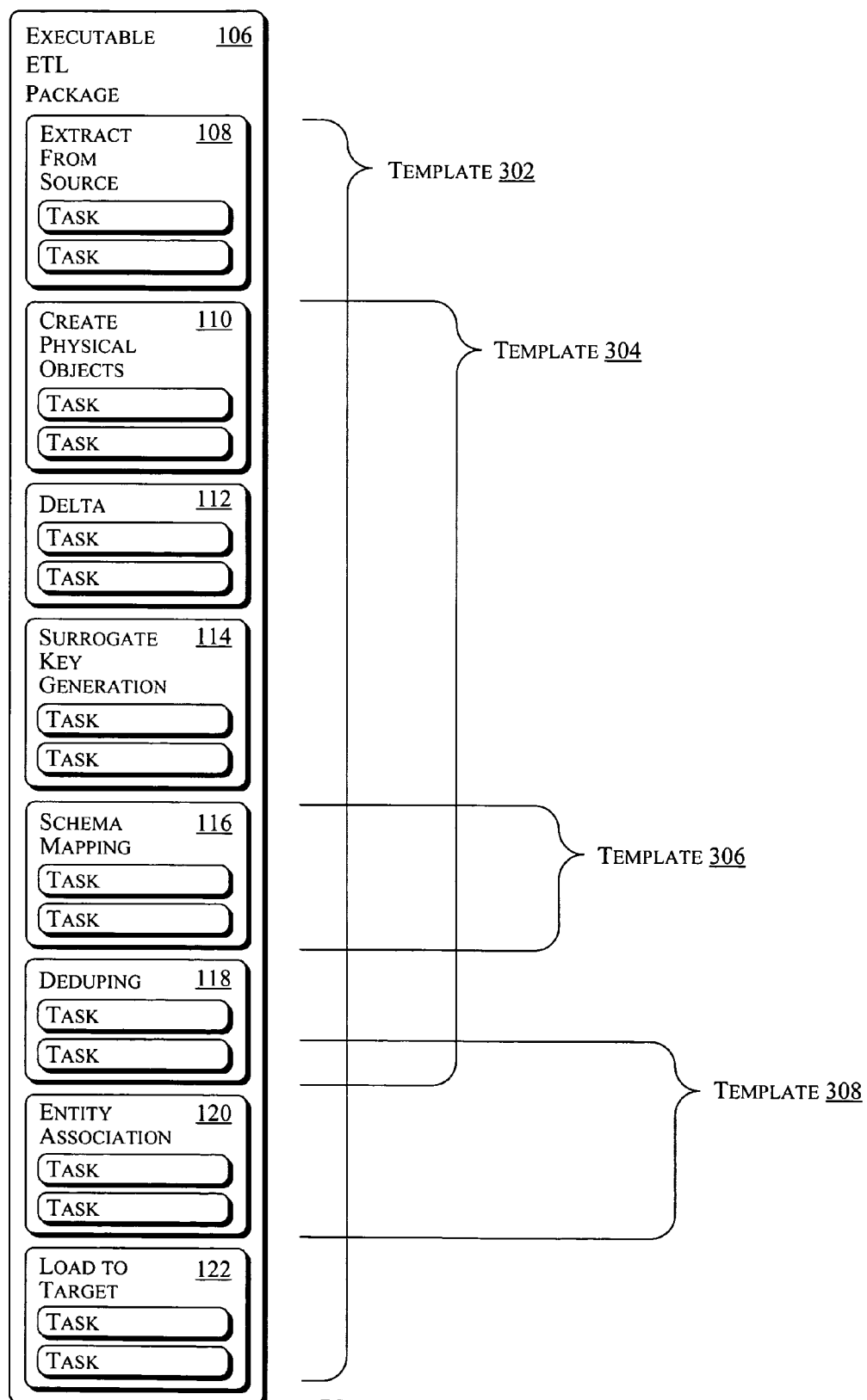
FIG. 3 illustrates exemplary templates.

FIG. 3 illustrates templates 302, 304, 306, and 308. Each of these templates is shown compared to executable ETL package 106, though the templates may be data-independent while the executable ETL package is not. These templates are shown for example and are not intended to limit application of the tools or any templates to any one particular ETL flow, process, package, or sequence of tasks or to infer that they must be based on this particular or any executable ETL package.

The sequence of tasks shown with these templates illustrates the flexibility of the templates. The selectable templates, in addition to those shown in FIG. 2, may comprise various types of tasks and processes, such as those shown in FIG. 3. Custom or customized selectable templates may also comprise these and many other sequences of tasks, also shown by example in FIG. 3.

Template 302 comprises a sequence of tasks capable of performing (once it is instantiated with appropriate data parameters) all of the ETL processes and tasks of executable ETL package 106. Template 304 comprises a sequence of tasks for performing five processes (110, 112, 114, 116, and 118). Template 306 comprises a sequence of tasks for mapping schemas between a data's source and target, here the same as schema mapping process 116. Template 308 comprises a sequence of tasks for one of the tasks of the deduping process 118 and all of the tasks of the entity association process 120.

As will be described in greater detail below, the tools permit a user to build an executable ETL package using one or more templates. This not only can save a programmer time by not needing to select each task, but it may also provide a superior set of tasks to those that the programmer might select. Also, the programmer may more easily instantiate the tasks of the template with data parameters than by selection of each task separately.

Generating and/or Altering Executable ETL Packages

Figure 4:
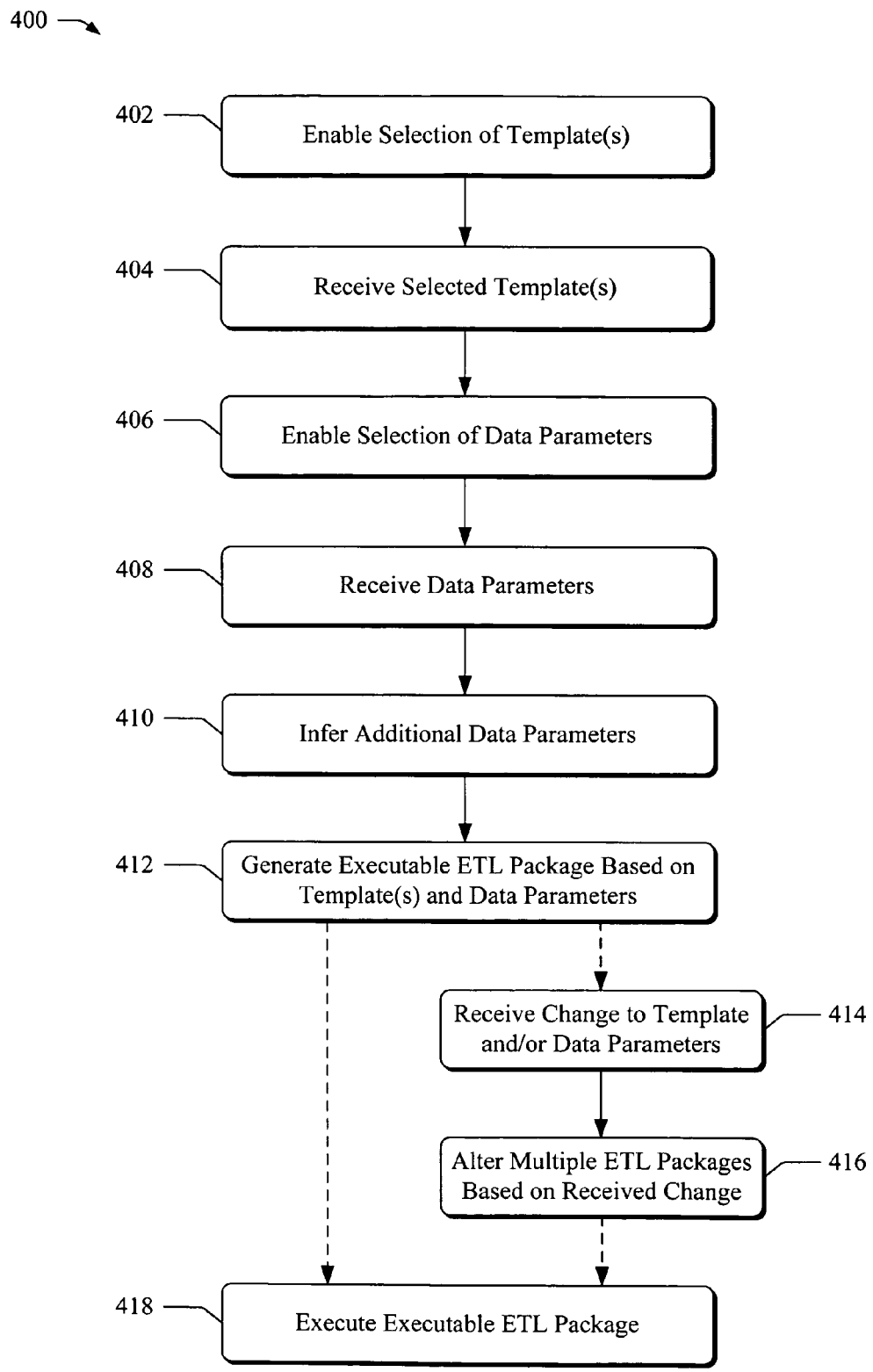
FIG. 4 is an exemplary process enabling generation and/or alteration of executable ETL packages using one or more templates.

FIG. 4 is an exemplary process 400 enabling generation of, or alterations to, executable ETL packages using one or more templates. It is illustrated as a series of blocks representing individual operations or acts performed by elements of operating environment 200 of FIG. 2, such as template hander 216 and package builder 224. This process may be implemented in any suitable hardware, software, firmware, or combination thereof; in the case of software and firmware, this process represents a set of operations implemented as computer-executable instructions stored in computer-readable media and executable by one or more processors.

Block 402 enables selection of one or more templates. Block 402 may do so through a graphical user interface, command-line interface, or, in the case of selection by a non-human selector, through APIs or other programmatic interaction. In one embodiment, template hander 216 enables selector 208 to select one or more of selectable templates 218 using a graphical user interface to provide one or more selected templates 220. For the ongoing embodiment, we assume that the selector chose dimension load template 230 by dragging an icon representing this template from one portion of a display to another.

Block 404 receives the selected template(s). Here template handler 216 receives the dimension load template.

Block 406 enables selection of data parameters. Data parameters may include a source table in which data is stored in a source database, a target table to store data in a data warehouse, and mapping between the two. Here we assume that selector 208 selects data currently held in a particular table of source database 102 of FIG. 1, a table in data warehouse 104 in which to store the data (after it is transformed), and a mapping between the two. This data can be total sales from purchase order agreements, dates on which the products were sold and delivered, the salesperson that sold the products, and the like.

Block 408 receives data parameters. These may be received from various sources, in some cases from selector 208 in response to block 406, or from other sources and in other manners. Here the parameters received are a source table, target table, and mapping between the two.

Block 410 infers, in some cases, data parameters based on those received. The tools may infer data parameters from a partial set of data parameters. Here package builder 224 infers all data parameters needed for execution of the dimension load template based on the received source table, target table, and mapping. These data parameters may comprise, for instance, classes or types of data that may be assigned by the data load template. A set of data, such as a purchase order total, may be characterized by dimensions, such as other classes of data also retrieved, here a date sold, a date delivered, a role of the salesperson, and the type of product sold. The data parameters (whether inferred or received) may be stored in or associated with metadata, such as metadata 242 of FIG. 2. Maintaining the data parameters using metadata (e.g., shredded metadata rather than grouped metadata), may enable the tools to use the data parameters again for the same or other templates.

Block 412 generates an executable ETL package based on one or more templates. Block 412 may do so with one or more selected templates, whether customized or not. Block 412 may also do so using a combination of selected template(s) and selected tasks. In one embodiment, the template is data-dependent or otherwise has instantiated data parameters. In this case the tools may remove the data in the template and replace it with the new data parameters (e.g., received data parameters from block 408).

Block 412 uses data parameters in generating an executable ETL package. A copy of the template may be instantiated with data parameters, while the template itself may remain data-independent. With these data parameters, the instantiated sequence of tasks from the template is capable of performing operations, such as loading dimensions for data as part of an executable ETL package. This portion may perform part, substantially all, or all of the tasks of the executable ETL package, such as to extract data, transform it, and/or load it.

In the ongoing embodiment, the package builder instantiates data parameters to tasks of the template based on a source table, target table, mapping between them, and dimension-related data parameters inferred from these received parameters. It may do so with or without the selector's knowledge.

In another embodiment, interim operations are performed, such as creating a declarative description (e.g., a package specification) and execution of that declarative description to create the executable ETL package.

Block 412 may be performed numerous times. A selector may, for instance, select two templates and one set of data parameters (in one or two steps). A selector may also select one template and two sets of parameters. Or, the selector may select the same data parameters and the same template but include it as part of ETL flows having other different parameters or tasks. Block 412 may then create multiple different executable ETL packages (such as 226 and 228 of FIG. 2).

In some cases a template and/or parameters are changed. If they aren't, the tools may proceed to execute the executable ETL package(s) at block 418 without performing blocks 414 and 416. If the template and/or parameters are changed, this change may enable alteration to one or more executable ETL packages. Blocks 414 and 416 may operate in conjunction with, or stand separate and independent from, blocks 402 to 412.

Block 414 receives a change to a template and/or data parameters. The tools enable a user to alter a template, such with addition, deletion, or alteration of a task in a template. The tools also enable a user to alter data parameters.

Block 416 alters multiple ETL packages based on the received change. If a template is changed and this template was used to build multiple ETL packages—even if those packages have different data parameters—the tools may alter the existing ETL packages responsive to a change to the template. Thus, if a user changes the dimension load template to add an email notification or a security task, the package builder may build replacements or alter the executable ETL packages that were built using the dimension load template to add this email notification or security task. If data parameters are changed, ETL packages having the old data parameters may be altered to reflect the new data parameters (or new ETL packages may be generated based on these new parameters).

If, as mentioned above, hundreds of executable ETL packages are based on a particular template, changing that template may be effective to change hundreds of executable ETL packages. This permits a user to make one change and have that change made to multiple packages. The tools may make changes to packages without user interaction other than interaction by a user to make a change to the template.

Block 418 executes the executable ETL package. The tools may execute the package following block 412 or 416. Here the tools execute a package effective to load dimensions for a purchase order.

CONCLUSION

The above-described systems and methods may enable ETL packages to be built more easily, accurately, and/or robustly. They may also enable ETL packages to be altered in bulk by altering a template and/or data parameters used in building those ETL packages. By so doing, persons building or altering ETL packages may save considerable time and resources as well as build and maintain superior ETL packages. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:

1. A computer-implemented method for building executable ETL (Extract, Transform, and Load) packages, the method comprising:
    enabling a selector to select a template, the template comprising a data-independent, coordinated sequence of tasks;
    receiving the selected template;
    enabling a selection of data parameters, the data parameters comprising:
        a source table in which data is stored in a source database;
        a target table to store data in a data warehouse; and
        a mapping between the source table and the target table;
    receiving the selection of data parameters;
    inferring additional data parameters required for execution of the template, the inferring based on the selection of received data parameters;
    instantiating the data parameters to tasks of the template based on the received source table, target table, and mapping between the source table and the target table, and the inferred additional data parameters;
    generating an executable ETL package based on the template and the data parameters; and
    executing the executable ETL package.

2. The method of claim 1, further comprising receiving a second template having a second coordinated sequence of tasks and wherein the act of generating generates the executable ETL package based on the first coordinated sequence of tasks, the second coordinated sequence of tasks, and the set of data parameters.

3. The method of claim 1, further comprising maintaining the set of data parameters using shredded metadata.

4. The method of claim 1, further comprising enabling selection one or more templates each having a coordinated sequence of tasks to provide a selected template and wherein the template received as part of the act of receiving is the selected template.

5. The method of claim 1, further comprising receiving an additional set of data parameters and wherein the act of generating generates an additional executable ETL package based on the coordinated sequence of tasks and the additional set of data parameters.

6. The method of claim 5, further comprising altering the executable ETL package and the additional executable ETL package responsive to a received change to the template or the set of data parameters.

7. The method of claim 1, wherein the template comprises instantiated data parameters and wherein the act of generating replaces the instantiated data parameters with the set of data parameters.

8. The method of claim 1, wherein the act of generating comprises instantiating the coordinated sequence of tasks with the set of data parameters.

9. One or more computer readable media storing processor-executable instructions that, when executed, cause one or more processors to perform a method, the method comprising:
    enabling a selector to select a template having a computer-readable, data independent, coordinated sequence of tasks capable of instantiation with data parameters effective to create a portion of an executable Extract, Transform, and Load (ETL) package with an executable form of the coordinated sequence of tasks;
    receiving the selected template;
    enabling a selection of data parameters, the data parameters comprising:
        a source table in which data is stored in a source database;
        a target table to store data in a data warehouse; and
        a mapping between the source table and the target table;
    receiving the selection of data parameters;
    inferring additional data parameters required for execution of the template, the inferring based on the selection of received data parameters;
    instantiating the data parameters to tasks of the template based on the received source table, target table, and mapping between the source table and the target table, and the inferred additional data parameters;
    generating an executable ETL package based on the template and the data parameters; and
    executing the executable ETL package.

10. The media of claim 9, wherein the template is further capable of instantiation with multiple sets of data parameters effective to create a portion of multiple and different executable ETL packages.

11. The media of claim 9, wherein the portion of the executable ETL package, when executed, is effective to perform one or more of the following processes: a dimension load process; a fact load process; a dimension load with auditing process; a fact load with auditing process; a data cleansing process; and an initial load process.

12. The media of claim 9, wherein execution of the portion of the executable ETL package is effective to perform one or more of the following processes: an extract from source process; a create physical objects process; a delta process; a surrogate key generation process; a schema mapping process; a deduping process; an entity association process; and a load to target process.

13. A computer-implemented method for constructing executable ETL (Extract, Transform, and Load) packages, the method comprising:

enabling a selector to select a template, the template comprising a data-independent, coordinated sequence of tasks;

receiving a change to a first ETL package or a template used to build the first ETL package;

enabling a selection of data parameters, the data parameters comprising:
  a source table in which data is stored in a source database;
  a target table to store data in a data warehouse; and
  a mapping between the source table and the target table;

receiving the selection of data parameters;

inferring additional data parameters required for execution of the template, the inferring based on the selection of received data parameters;

instantiating the data parameters to tasks of the template based on the received change to the first ETL package or the template used to build the first ETL package, the source table, the target table, and mapping between the source table and the target table, and the inferred additional data parameters;

altering, responsive to the change, the first ETL package and a second ETL package, each of the first and second ETL packages having first and second task sequences and where the first and second task sequences or a portion of each of the first and second task sequences are identical or where the first and second ETL packages are governed at least in part by the template;

generating an executable first ETL package and an executable second ETL package based on the received change to the first ETL package or template used to build the first ETL package and the received data parameters; and executing the executable first ETL package and the executable second ETL package.

14. The method of claim 13, wherein the act of altering is performed without user interaction.

15. The method of claim 13, wherein the act of receiving receives the change to the template and the template comprises a sequence of tasks contained in both the first and second ETL packages, and the act of altering comprises altering or recreating the first ETL package and the second ETL package to reflect the change to the template.

16. The method of claim 15, wherein the act of altering is performed without user interaction.

* * * * *